(No Model.)
J. C. W. BOICE.
Animal Trap.
No. 233,917.          Patented Nov. 2, 1880.
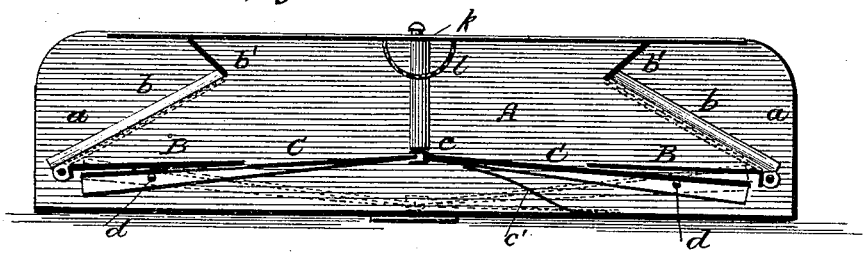
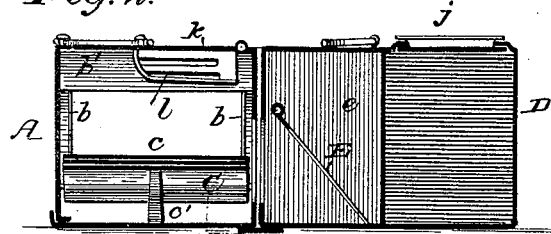
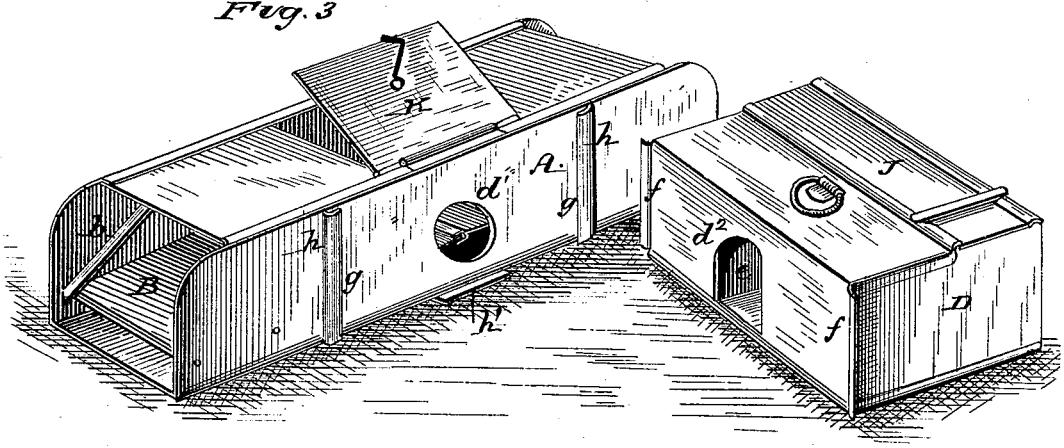
Witnesses
Fred. G. Dieterich
B. L. Dieterich
Inventor
Joseph C. W. Boice
by DeWitt C. Allen
Attorney

UNITED STATES PATENT OFFICE.

JOSEPH C. W. BOICE, OF LINCOLN, NEBRASKA.

ANIMAL-TRAP.

SPECIFICATION forming part of Letters Patent No. 233,917, dated November 2, 1880.

Application filed April 22, 1880. (No model.)

*To all whom it may concern:*

Be it known that I, JOSEPH C. W. BOICE, a citizen of the United States, residing at Lincoln, in the county of Lancaster and State of Nebraska, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a longitudinal section of my improved trap. Fig. 2 is a transverse section of the same. Fig. 3 is a perspective view of the box and cage detached.

This invention relates to certain new and useful improvements in the class of self-setting traps; and the invention consists, essentially, in the combination, with a rectangular box having open ends, of pivoted doors and pivoted treadle-levers having their inner or meeting ends connected by a knuckle-joint, whereby the weight of an animal entering the trap will depress the inner or meeting ends of said treadle-levers, thus raising their outer end, and through the medium of which the pivoted doors will be raised and closed, thus retaining the animal therein.

It further consists in the novel combination and arrangement of parts, all as will be hereinafter fully described, and specifically pointed out in the claims.

In the drawings, A represents a rectangular box having open ends $a\ a$, which are closed upon an animal entering said box by doors B B, having their lower ends pivoted to the sides of the box near the bottom and outer ends thereof, as shown in Fig. 1, the sides of the box being provided with inclined flanges $b\ b$ and transverse inclined plate $b'$, against which said doors rest when thrown up by the treadle-levers C C. These levers are connected together at their inner or meeting ends by a knuckle-joint, $c$, and pivoted to the sides of the box near their outer ends, as shown at $d$ $d$, said levers extending almost to the open ends of the box, and supporting the inner ends of the doors B B, both in a horizontal and closed position. It will therefore be perceived that, said treadle-levers being pivoted near their outer ends, and connected at their inner or meeting ends by a knuckle-joint, upon an animal entering the box the levers will be depressed at their inner or meeting ends, thus raising their outer ends, and with them the doors B B, inclosing the animal in the box until his weight is removed from the levers.

$c'$ represents a spring arranged under the knuckle-joint $c$, to assist in tripping or operating the lever in case it should bind; or in case any of the operating parts of the trap should bind, the light spring would assist in working the treadles.

The box is provided with an opening, $d'$, at one side and near the center thereof, which communicates with an opening, $d^2$, through the side of the cage D, which is kept closed by a flap-door, E, and stationary side plates, $e\ e$, all as clearly shown in Fig. 2.

The cage is provided with vertical projecting flanges $f\!f$, which fit and slide in the grooves $g\ g$, formed by the vertical flanges $h\ h$, secured to the sides of the box A, a projecting horizontal flange, $h'$, at or near the bottom of the box forming a rest or support for the cage when secured to the box. The cage can therefore be readily removed from the box, when desired, by simply raising the flanges $f\!f$ vertically upward out of the grooves $g\ g$. The cage and box are respectively provided with top sliding and hinged doors $j\ k$, affording ready access thereto when desired, the door $k$ being provided on its inner side with a bait cup or receptacle, $l$.

The operation of my improved trap is obvious from the foregoing, it being understood that as soon as an animal enters the box his weight will depress the levers at the center of the box, thus keeping the doors closed, and as soon as it enters the cage the levers will resume their original position by being connected by the knuckle-joint, and the weight of the doors resting on the outer ends of the levers, thus always leaving the trap set, except when an animal is caught and retained in the box and until it passes into the cage.

I am aware that a transverse inclined plate against which a pivoted door rests when closed, said door being operated directly by a pivoted platform, is common in animal-traps, and such I do not wish to be understood as claiming, broadly, as of my invention.

Having thus fully described my invention, what I claim as new, and desire to secure by Letters Patent, is—

1. In an animal-trap, the combination, with a box having open ends, of the pivoted doors B B and treadle-levers C C, connected together at their inner or meeting ends by a knuckle-joint, c, whereby said doors are directly operated by the treadle-levers, substantially as herein shown and described.

2. In an animal-trap, the combination, with a box having open ends, of the pivoted doors B B, treadle-levers C C, for operating said doors, connected together at their inner or meeting ends by a knuckle-joint, c, and the spring c', substantially as and for the purpose herein shown and described.

3. In an animal-trap, the combination, with the box A, of the pivoted levers C C, connected together at their inner or meeting ends by a knuckle-joint, c, pivoted doors B B, inclined side flanges, b b, and transverse inclined plate b', the several parts arranged relatively to each other substantially in the manner as and for the purpose herein shown and described.

In testimony whereof I affix my signature in presence of two witnesses.

JOSEPH C. W. BOICE.

Witnesses:
W. H. RIGGS,
J. J. GRIMES.